United States Patent
Togashi et al.

(10) Patent No.: US 6,225,638 B1
(45) Date of Patent: *May 1, 2001

(54) DISC DISCRIMINATION DEVICE AND DISC DISCRIMINATION METHOD

(75) Inventors: Mitsuhiro Togashi; Hirobumi Okada, both of Fukushima-ken (JP)

(73) Assignee: Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/026,803

(22) Filed: Feb. 20, 1998

(30) Foreign Application Priority Data

Feb. 20, 1997 (JP) .................................. 9-036266

(51) Int. Cl.$^7$ .................................................. G01N 21/86
(52) U.S. Cl. .............................. 250/559.29; 250/559.27; 250/201.5; 356/381
(58) Field of Search .................... 250/559.29, 559.4, 250/201.5; 369/44.25, 44.27, 54, 58, 120, 121, 122, 106, 108, 94; 356/381, 416, 419, 448, 423

(56) References Cited

U.S. PATENT DOCUMENTS

| | | | |
|---|---|---|---|
| 5,003,521 | * 3/1991 | Yoshida et al. | 369/44.25 |
| 5,042,020 | * 8/1991 | Endo | 369/44.31 |
| 5,410,530 | 4/1995 | Best et al. | 369/100 |
| 5,684,771 | * 11/1997 | Furukawa et al. | 369/58 |
| 5,742,575 | * 4/1998 | Yamakawa et al. | 369/58 |
| 5,802,021 | * 9/1998 | Mukaida | 369/34 |
| 5,802,037 | * 9/1998 | Lee et al. | 369/120 |
| 5,831,952 | * 11/1998 | Yamada et al. | 369/58 |
| 5,875,164 | * 2/1999 | Yamakawa et al. | 369/58 |
| 5,907,530 | * 5/1999 | Cho et al. | 369/112 |
| 5,912,868 | * 6/1999 | Hayashi et al. | 369/58 |

FOREIGN PATENT DOCUMENTS

| | | |
|---|---|---|
| 0 294 490 A1 | 7/1988 | (EP) . |
| 01248354 | 10/1989 | (JP) . |
| 06314465 | * 11/1994 | (JP) . |
| 09007287 | 1/1997 | (JP) . |
| 09035401 | 2/1997 | (JP) . |
| 09161388 | 6/1997 | (JP) . |

\* cited by examiner

*Primary Examiner*—Que T. Le
*Assistant Examiner*—Thanh X. Luu
(74) *Attorney, Agent, or Firm*—Brinks Hofer Gilson & Lione

(57) ABSTRACT

In a disc discrimination device provided with a disc apparatus on which a plurality of types of disc can be loaded, when a disc D is loaded on a turntable, detection light is irradiated from light irradiation means 3 and light receiving means 4 receives the light reflected from a recording surface. Since the distance from the front surface Da of the disc to the recording surface thereof is different depending upon a type of disc, the type of the disc can be discriminated depending upon the difference between the thicknesses of the protective layer of the disc by obtaining the difference between the ranges of the light beam of reflected light ① and ②. Further, the difference between the reflection factors of the light on the recording surface can be determined by the output from addition means 6, whereby many types of disc can be discriminated. With this arrangement, the disc apparatus can promptly and simply discriminate a type of disc loaded thereon.

22 Claims, 4 Drawing Sheets

DISC DISCRIMINATION DEVICE AND DISC DISCRIMINATION METHOD

BACKGROUND OF THE INVENTION

1. Field of the Invention

The present invention relates to a disc discrimination device and a disc discrimination method capable of discriminating what type of disc is loaded on a disc apparatus on which a different type of disc such as a CD, DVD and the like can be loaded.

2. Description of the Related Art

Recently, there have been developed disc apparatuses on which a different type of disc can be loaded. In this case, what type of disc is loaded on the disc apparatus must be discriminated.

However, a CD (Compact Disc), DVD (Digital Versatile Disc), CD-ROM, etc. have the same disc diameter of 12 cm and the clamping center hole thereof also has the same diameter. Thus, a type of disc cannot be discriminated from only the shape and size thereof.

To cope with this problem, conventional disc apparatuses employ such a method of discriminating a type of disc loaded thereon that the signal recorded on the disc is read by an optical head by rotating the disc when it is loaded to thereby determine the transfer velocity and arrangement of the thus read signal.

However, the method of discriminating a type of disc loaded on the disc apparatus by rotating the disc and reading its signal by the optical head cannot instantly discriminate the type just after the disc is loaded and a long time is required to the completion of the discrimination.

When, for example, only two types of disc, namely, the CD and DVD are discriminated by the above method, it is sufficient for a control circuit to distinguish only two types of signal. However, in a disc apparatus on which more types of disc are loaded, it is necessary for the control circuit to discriminate a plurality of types of signal and the discrimination method effected by the control circuit is made very complex.

An object of the present invention for solving the above problem of prior art is to provide a disc discrimination device and a disc discrimination method capable of discriminating a disc in a short time without the need of reading the signal recorded on the disc.

Another object of the present invention is to provide a disc discrimination device and a disc discrimination method capable of certainly discriminating respective types of disc even in a disc apparatus on which many types, namely, three types or more of disc are loaded.

SUMMARY OF THE INVENTION

A disc discrimination device of the present invention provided with a disc apparatus on which loaded is a different type of disc whose thickness from a front surface to a recording surface is different is characterized by comprising light irradiation means for obliquely irradiating detection light onto the recording surface, two light receiving regions for receiving the reflected light reflected from the recording surface, means for determining the difference between the quantities of reflected light received by the two light receiving regions and discrimination means for discriminating a disc based on the difference.

In the invention, a disc can be discriminated by the difference between the regions where the reflected light returns when the detection light is obliquely irradiated onto the recording surface. The above two light receiving regions may be provided with two light receiving elements such as photodiodes with a specific area which are disposed thereto adjacent to each other or may use a photodiode divided into two portions. Otherwise, they may use light receiving means such as a CCD having a multiplicity of portions for detecting light by dots and form the light receiving means to two regions capable of detecting the reflected light. These modifications are applicable to the following inventions.

A disc discrimination device of the present invention provided with a disc apparatus on which loaded is a different type of disc in which the reflection factor of light is different on a recording surface is characterized by comprising light irradiation means for irradiating detection light onto the recording surface, light receiving means for receiving the light reflected from the recording surface and discrimination means for discriminating a disc based on the quantity of reflected light received by the light receiving means.

According to the invention, it is possible to discriminate a disc in which the reflection factor on a recording surface is different with respect to a specific wavelength can be discriminated.

A disc discrimination device of the present invention provided with a disc apparatus on which loaded are a plurality of types of disc which include a disc whose thickness from a front surface to a recording surface is different and a disc in which the reflection factor of light is different on a recording surface is characterized by comprising light irradiation means for obliquely irradiating detection light onto the recording surface, two light receiving regions for receiving the reflected light reflected from the recording surface, means for determining the difference between the quantities of reflected light received by the two light receiving regions, means for determining the sum of the quantities of reflected light received by the two light receiving regions and discrimination means for discriminating a type depending upon the difference between the thicknesses from the front surface of the disc to the recording surface thereof based on the difference as well as discriminating a type depending upon the difference between the reflection factors of the light on the recording surface based on the sum.

In the invention, a disc can be discriminated by detecting both the difference between the thicknesses of the protective layer of the disc and the difference between the reflection factors of the light having a specific wavelength on the recording surface of the disc based on the quantities of reflected light received by the two light receiving regions. The two types of discrimination executed to discriminate, for example, two types of disc not only increases discrimination accuracy but also makes discrimination for specifying many types of disc possible.

The above disc discrimination device is preferably arranged such that light having a different wavelength is individually irradiated from the light irradiation means and the discrimination means discriminates a type depending upon the difference between the reflection factors of the light on the recording surface of the disc based on the quantity of reflected light received and the wavelength of the detection light.

In this case, one piece or one set of light receiving means may be provided, two sets of light sources from which light having different wavelength is individually emitted may be provided with a light emitting unit in adjacent to each other as light irradiation means and the two light sources may be switched so that light is individually emitted therefrom at a different time. Otherwise, it is also possible that a light source having one wavelength and light receiving means are arranged as a set, a light source having another wavelength and the light receiving means are arranged as a set and the light irradiation means and the light receiving means is arranged as an individual set for each wavelength to be used.

Otherwise, detection light including light having a different wavelength is irradiated from the light irradiation means, wavelength separation means for separating the light reflected from the recording surface to a different wavelength is disposed in front of the light receiving means, the light receiving means includes individual light receiving regions for individually receiving the reflected light having the different wavelength and the discrimination means discriminates a type depending upon the difference between the reflection factors of the light on the recording surface of the disc based on the quantities of light received by the respective light receiving regions and the wavelengths of the light applied to the light receiving regions.

The disc discrimination device for discriminating a disc based on the reflection factor of light on a recording surface is preferably provided with a monitor reflection surface for reflecting the detection light irradiated from the light irradiation means toward the light receiving regions when no disc is loaded.

In the arrangement provided with the monitor reflection surface, the quantity of light reflected from the monitor reflection surface is detected when, for example, a power supply is turned on and when a disc is actually loaded, the discrimination means determines the quantity of light reflected therefrom based on the above quantity of received light. Therefore, even if a light source whose quantity of light emitted therefrom is deteriorated due to its use for a long time or a light source whose quantity of light is always fluctuated is used, the difference of reflection factors on a recording surface can be always accurately discriminated.

A disc discrimination method of the present invention using the above disc discrimination device is characterized by comprising the steps of discriminating a type depending upon the difference of the thicknesses from the front surface of a disc to the recording surface thereof based on the difference between the quantities of reflected light received by the two light receiving regions first and thereafter discriminating a type depending upon the difference between the reflection factors of the light on the recording surface based on the sum of the quantities of reflected light received by the two light receiving regions to thereby discriminate a plurality of types of disc.

On the contrary, it is also possible to discriminate the difference between the reflection factors on the recording surface based on the sum of the quantities of reflected light first and thereafter discriminate the difference between the thicknesses of the protective layer covering the recording surface based on the difference between the quantities of reflected light. Further, it is preferable to execute the above discrimination using a different wavelength. A plurality of types of disc can be discriminated by the method.

DESCRIPTION OF THE PREFERRED EMBODIMENT

Figure 1:
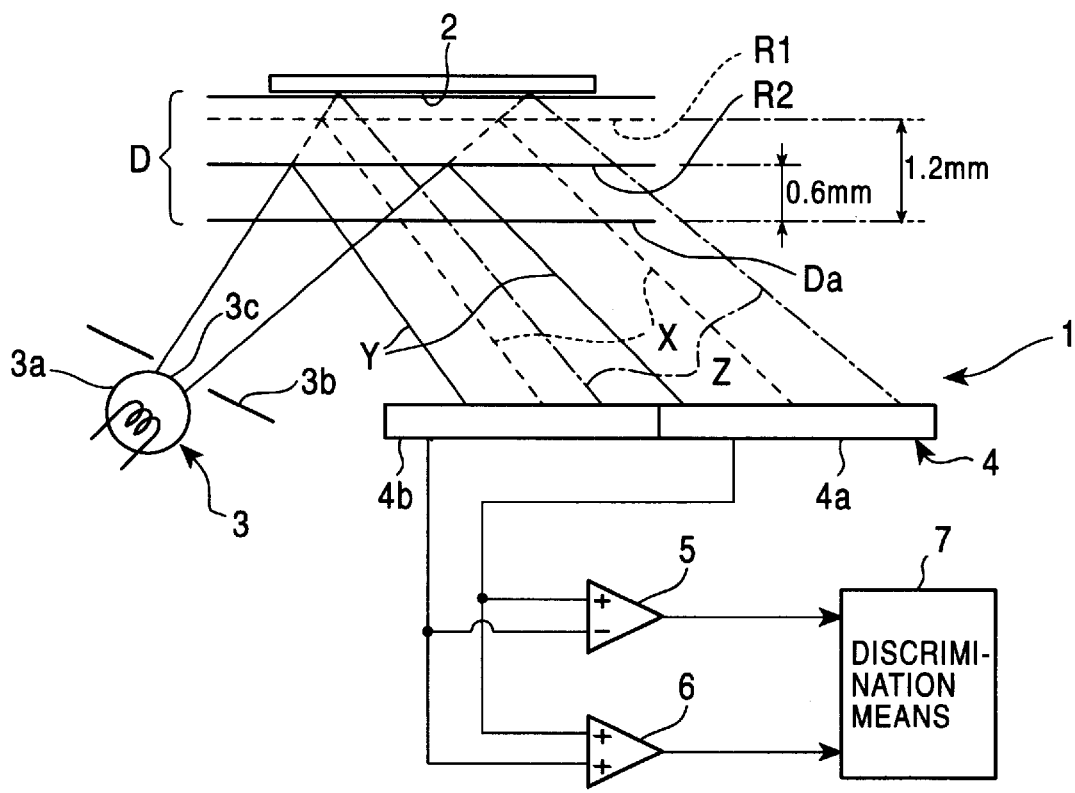
FIG. 1 is a view describing a first embodiment of a disc discrimination device of the present invention.

FIG. 1 is a view describing a first embodiment of a disc discrimination device of the present invention.

The disc discrimination device 1 is provided with a disc apparatus on which a different type of disc is loaded and mounted. The disc discrimination device 1 is mounted, for example, at a position on the side of a turntable on which the disc is loaded out of the way of the moving region of an optical head or on the optical head.

In FIG. 1, a disc clamped on the turntable of the disc apparatus is shown by symbol D. Symbol Da shows the front surface of the disc. When the disc D is, for example, a CD, CD-R or CD-E, the protective layer interposed between a recording surface R1 and the front surface Da of the disc has a thickness of 1.2 mm. When the disc D is a DVD, DVD-R or DVD-RAM, the protective layer interposed between a recording surface R2 and the front surface Da of the disc has a thickness of 0.6 mm. Since the disc front surface Da is supported on the same surface of the turntable in any discs, there is a difference between the height of the recording surface R1 and that of the recording surface R2 in the disc apparatus.

The disc discrimination device 1 is also provided with a monitor reflection surface 2 positioned above the disc D loaded. The monitor reflection surface 2 can be composed of a mirror sheet installed above the disc apparatus or a metal film adhered to a mechanical element of a device main body positioned above the region where the disc D is loaded or to the ceiling of a cabinet.

Light irradiation means 3 is disposed at the position which confronts the disc D loaded on the turntable of the disc apparatus as well as the monitor reflection surface 2 when the disc D is not loaded. The light irradiation means 3 includes a light source 3a and stop means 3b for stopping the light beam of detection light irradiated from the light source 3a.

Although FIG. 1 shows the only one light source 3a, the light source 3a in the disc discrimination device 1 is composed of two light sources for emitting light having a different wavelength. The wavelength of the light emitted from one light source is 780 nm or near to it, the wavelength of the light emitted from the other light source is 650 nm or near to it and both the light sources are switched to emit the light at a different time. A through hole 3c defined to the stop means 3b is a hole such as, for example, a slit having a specific opening width and a length extending longer than the opening width in the direction perpendicular to the paper surface, a square hole or a circular hole. The detection light is obliquely emitted from the light irradiation means 3 onto the front surface of the disc D.

Light receiving means 4 is disposed at the position where the light irradiated from the light irradiation means 3 and reflected from the recording surface R1 or recording surface R2 of the disc D or the monitor reflection surface 2 impinges. The light receiving means 4 includes two light receiving regions 4a and 4b which are divided in the inclining direction of the reflected light. There are provided subtraction means 5 for determining the difference between the photoelectric conversion output obtained from the one light receiving region 4a and the photoelectric conversion output obtained from the other light receiving region 4b and addition means 6 for adding the photoelectric conversion outputs obtained from both the light receiving regions 4a and 4b as an electric circuit arrangement to which the light receiving means 4 is connected. There is also provided discrimination means 7 to which the outputs from the subtraction means 5 and the addition means 6 are supplied. The subtraction means 5 is composed of a differential amplifier or the like and the addition means 6 is composed of a cumulative amplifier or the like. The discrimination means is composed of a microcomputer or the like and the output from the subtraction means 5 and the output from the addition means 6 are subjected to A/D (analog to digital conversion) and compared with each other by the microcomputer or the like.

Operation of the disc discrimination device 1 shown in FIG. 1 will be described.

What is shown by symbol ① of the light beams received by the light receiving means 4 is a reflected light beam from the recording surface R1 of the disc whose protective layer has the thickness of 1.2 mm and what is shown by symbol ② thereof is a reflected light beam from the recording surface R2 of the disc whose protective layer has the thickness of 0.6 mm. In addition, a reflected light beam reflected from the monitor reflection surface 2 when the disc D is not loaded is shown by symbol ③.

The disc discrimination device 1 can discriminate the difference between the thicknesses of the protective layers (1.2 mm and 0.6 mm). It can also discriminate the difference among the reflection factors of the light on the recording surfaces R1 and the R2 together with the above difference between the thicknesses and further can discriminate the difference among the reflection factors on the recording surface R1 or R2 to the light having the wavelength of 780 nm or near to it and the difference among the reflection factors thereon to the light having the wavelength of 650 nm or near to it.

The following table shows the relationship between the types of disc and the thicknesses of the protective layer and further the light reflection factors on the recording surface R1 or the recording surface R2 depending upon the types of disc as to both the wavelength of 780 nm and the wavelength of 650 nm.

TABLE

| Type of Disc | Thickness of Protective Layer (mm) | Reflection Factor (%) (Wavelength 780 nm) | Reflection Factor (%) (Wavelength 650 nm) |
| --- | --- | --- | --- |
| CD | 1.2 ± 0.1 | >70 | >70 |
| CD-R | 1.2 ± 0.1 | >65 | 10 |
| CD-E | 1.2 ± 0.1 | 15–25 | 15–25 |
| PD | 1.147–1.281 | 24–37 | 24–37 |
| DVD | 0.6 ± 0.04 | >70 | >70 |
| DVD-R | 0.6 ± 0.04 | <20 | 80 |
| DVD-RAM | 0.6 ± 0.04 | 30 | 30 |

When a disc whose protective layer has the thickness of 1.2 mm is loaded and detection light having any one of the wavelengths is irradiated from the light irradiation means 3, the light is reflected by the recording surface R1 located 1.2 mm above the disc front surface Da and the reflected light ① is received by both the light receiving regions 4a and the 4b. When a disc whose protective layer has the thickness of 0.6 mm is loaded and detection light having the same wavelength as in the case of the disc having the 1.2 mm protective layer is irradiated from the light irradiation means 3, the light is reflected by the recording surface R2 located 0.6 mm above the disc front surface Da and the reflected light ② is received by both the light receiving regions 4a and the 4b.

The range where the light beam impinges on the light receiving means 4 is different between the reflected light ① and the reflected light ② depending upon the difference between the thicknesses of the protective layers, namely, the difference between the heights from the disc front surface Da to the recording surfaces R1 and R2. As a result, the ratio between the quantity of light received on the light receiving region 4a and the quantity of light received on the light receiving region 4b is different between the reflected light ① and the reflected light ②.

Therefore, the difference between the quantity of light received on the light receiving region 4a and the quantity of light received on the light receiving region 4b determined by the subtraction means 5 permits the discrimination means 7 to discriminate whether the height from the front surface Da of the disc to the recording surface is 1.2 mm or 0.6 mm. When set as a threshold value is, for example, a value located at a midpoint between the difference between the quantities of light received by the light receiving region 4a and the light receiving region 4b when the position of the recording surface is 1.2 mm high and the difference between the quantities of light received by the light receiving region 4a and the light receiving region 4b when the position of the recording surface is 0.6 mm high, the discrimination means 7 can discriminate a disc depending upon the difference between the thicknesses of the protective layer by comparing the threshold value and the output obtained from the subtraction means 5.

When any of the discs D is not loaded, the detection light from the light irradiation means 3 is reflected by the monitor reflection surface 2 and received by the light receiving means 4. At the time, since the range of the light beam of the reflected light is positioned rightward of the reflected light ① in the figure, the difference between the quantity of light received by the light receiving region 4a and the quantity of light received by the light receiving region 4b is greater than the case of the reflected light ①. As a result, whether any disc is loaded or not can be also discriminated by discriminating the difference between the quantity of light in the case of the reflected light ① and the difference of the quantity of light in the case of the reflected light ③ based on another threshold value. Further, when the monitor reflection surface 2 is not provided, since the quantity of light received by the light receiving means 4 is greatly reduced without the loading of the disc D, whether the disc D is loaded or not can be also discriminated by the reduction of the quantity of light received. Although the subtraction means 5 is provided in FIG. 1, it is also possible without the provision of the subtraction means 5 to directly input the photoelectric conversion output from the light receiving region 4a and the photoelectric conversion output from the light receiving region 4b to the discrimination means 7 to thereby directly determine the difference between the quantities of light received by both the light receiving regions 4a and 4b and thereafter compare the difference with the above threshold value. Otherwise, although it is also possible to determine the ratio between the photoelectric conversion output from the light receiving region 4a and the photoelectric conversion output from the light receiving region 4b by the discrimination means 7 and detect the difference between the thicknesses of the protective layer based on the ratio, the present invention substantially includes the determination of the ratio to the determination of the difference between the quantities of received light.

Whether the protective layer has the thickness of 1.2 mm or 0.6 mm can be discriminated by the output from the subtraction means 5. Thus, it is possible to detect the difference between the CD, CD-R, CD-E and the DVD, DVD-R, DVD-RAM shown in Table 1. Further, since the thickness of the protective layer of a PD is analogous to that of the CD and the like, the PC can be also discriminated.

Although the thickness of the protective layers of for example, the CD and the CD-E is 1.2 mm as shown in Table 1, the reflection factors of the recording surface R1 of them are greatly different from each other. That is, the reflection factor of the recording surface of the CD is regulated to 70% or greater by the standard, whereas the reflection factor of the recording surface of the CD-E is regulated from 15 to 25% by the standard.

When light is irradiated from the light source having any one of the wavelengths and the output from the addition means 6 is monitored after it is discriminated that the position of the recording surface R1 is 1.2 mm high by the output from the subtraction means 5, the sum of the quantities of received light obtained from the addition means 6 is large when a loaded disc is the CD, whereas the sum of the quantities of light is small when the loaded disc is the CD-E. Therefore, when a value located at a midpoint between the quantities of light reflected from both the discs is set to the discrimination means 7 as a threshold value and the quantity of light received from the addition means 6 is compared with the threshold value, it can be discriminate whether the loaded disc is the CD or the CD-E.

This is also applicable to the discrimination of the DVD and the DVD-RAM which have the protective layer of 0.6 mm thick likewise. When light having any one of the wavelengths is irradiated after it is determined by the output from the subtraction means 5 that the thickness of the protective layer is 0.6 mm, the reflection factor of the recording layer is greatly different between the DVD and the DVD-RAM. Thus, the discrimination means 7 can discriminate whether the loaded disc is the DVD or the DVD-RAM by the comparison of the output from the addition means 6 with the threshold value.

Next, although the reflection factors of the recording surface R1 of the CD and the CD-R to the light having the wavelength of 780 nm is greater than 70% (CD) and greater than 65% (CD-R) and both the reflection factors are analogous to each other, the reflection factors of the recording surfaces R1 of them are greatly different as to the light having the wavelength of 650 nm. That is, as to the light having the wavelength of 650 nm, the reflection factor of the CD is greater than 70% and the reflection factor of the CD-R is regulated to 10% by the standard. Therefore, the irradiation of the light having the wavelength of 650 nm or near to the loaded disc from the light source and the monitoring of the quantity of light received from the addition means 6 permit to discriminate whether the loaded disc is the CD or the CD-R.

This is also applicable to the DVD and the DVD-R. The reflection factors of the light having the wavelength of 650 nm on the recording surface R2 of the DVD and the DVD-R are analogous to each other. However, the reflection factors on the recording surface R2 of them are greatly different as to the light having the wavelength of 780 nm. That is, the reflection factor of the DVD is regulated greater than 70% and that of the DVD-R is regulated smaller than 20% by the standard. Therefore, the irradiation of the light having the wavelength of 780 nm or near to it from the light source and the discrimination of the output from the addition means 6 by the discrimination means 7 permit to discriminate whether the mounted disc is the DVD or the DVD-R.

When the disc is discriminated by the difference between the reflection factors on the recording surface, it is preferable that the quantity of light from the light source 3a is stable. However, the quantity of the detection light from the light source 3a may be fluctuated by the variation of the voltage of a power supply, the deterioration of the light source due to its use for a long time and the like. This problem can be coped with by the provision of the monitor reflection surface 2 as shown in FIG. 1. That is, the difference between the reflection factors on the recording surface of disc can be discriminated even if the quantity of light from the light source 3a is fluctuated in such a manner that light is irradiated from the light source 3a when a disc is not loaded, the light reflected from the monitor reflection surface 2 is applied to the light receiving means 4 and the quantity of light is detected by the output from the addition means 6, whereas the output from the addition means 6 when the disc is loaded is discriminated using the amount of light reflected from the monitor reflection surface 2 as a reference.

Figure 2:
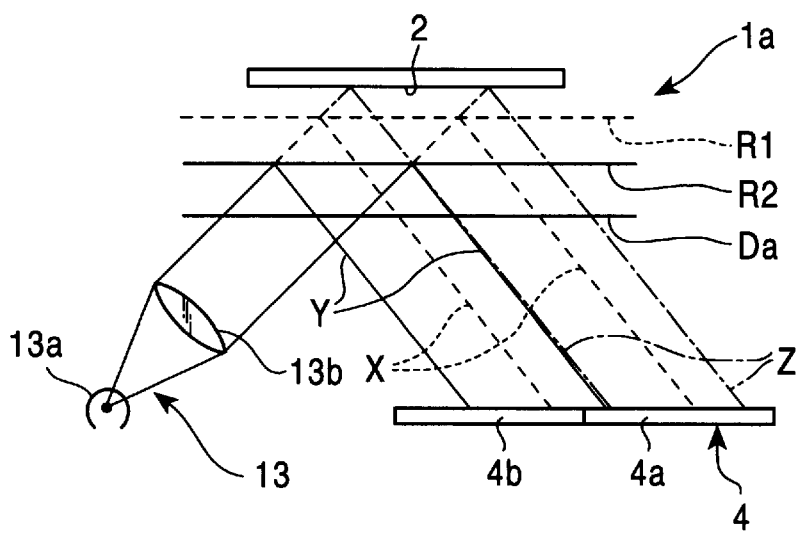
FIG. 2 is a view describing a modification of the disc discrimination device shown in FIG. 1.
Figure 3:
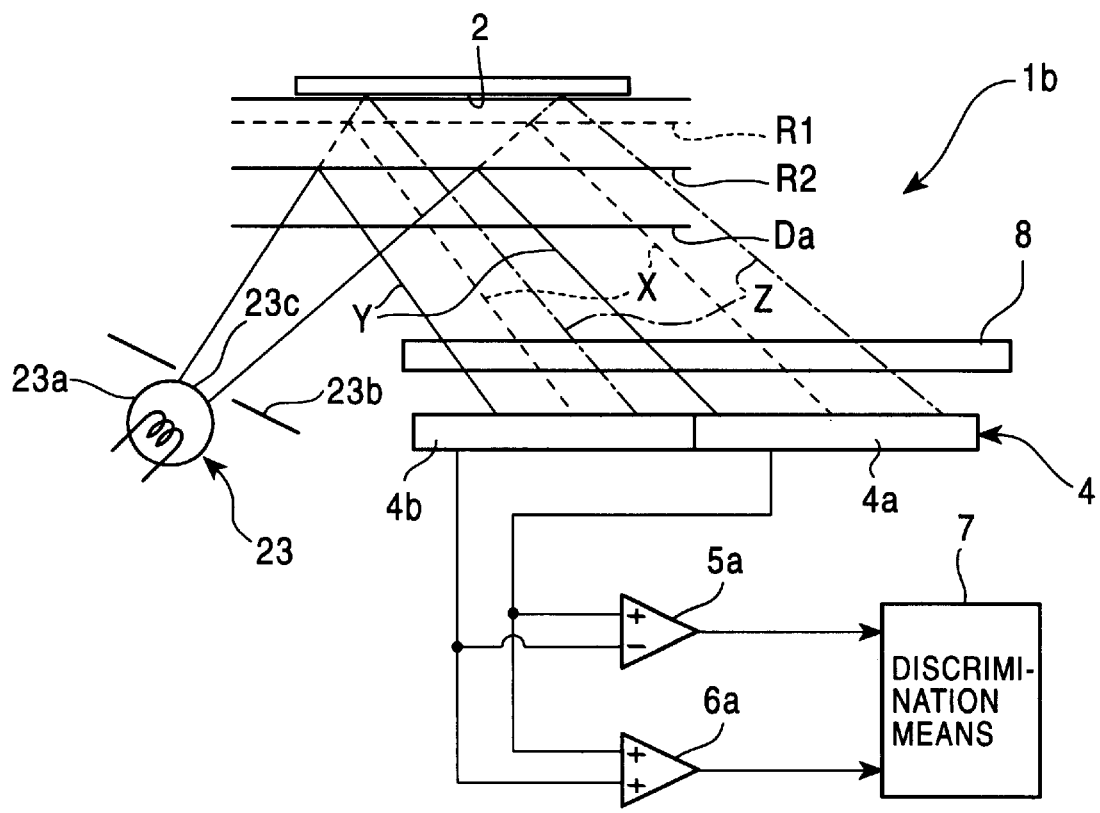
FIG. 3 is a view describing a second embodiment of the disc discrimination device of the present invention.

FIG. 2 and FIG. 3 show other embodiments of the disc discrimination device of the present invention.

In a disc discrimination device 1a shown in FIG. 2, light irradiation means 13 is composed of two light sources 13a for emitting detection light having a different wavelength and a collimator lens 13b for making the light from the light sources to parallel light beams. The light from each of the light sources 13a is reflected from the recording surface R1 or R2 of the disc D or from the monitor reflection surface 2 and received by the light receiving means 4. FIG. 2 shows the light reflected from the respective surfaces by ①, ② and ③ likewise the light in FIG. 1. A condenser lens for condensing the reflected light ①, ② or ③ may be disposed in front of the light receiving means 4.

In a disc discrimination device 1b shown in FIG. 3, a light source 23a provide with light irradiation means 23 is, for example, a white light source for emitting light including a wavelength near to 780 nm and a wavelength having 650 nm.

Figure 4A:
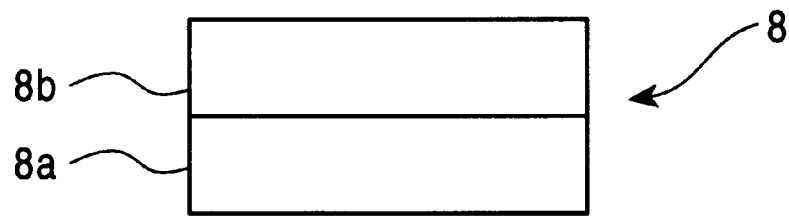
FIG. 4A is a plan view of a wavelength filter and FIG. 4B is a plan view of detection means.
Figure 4B:
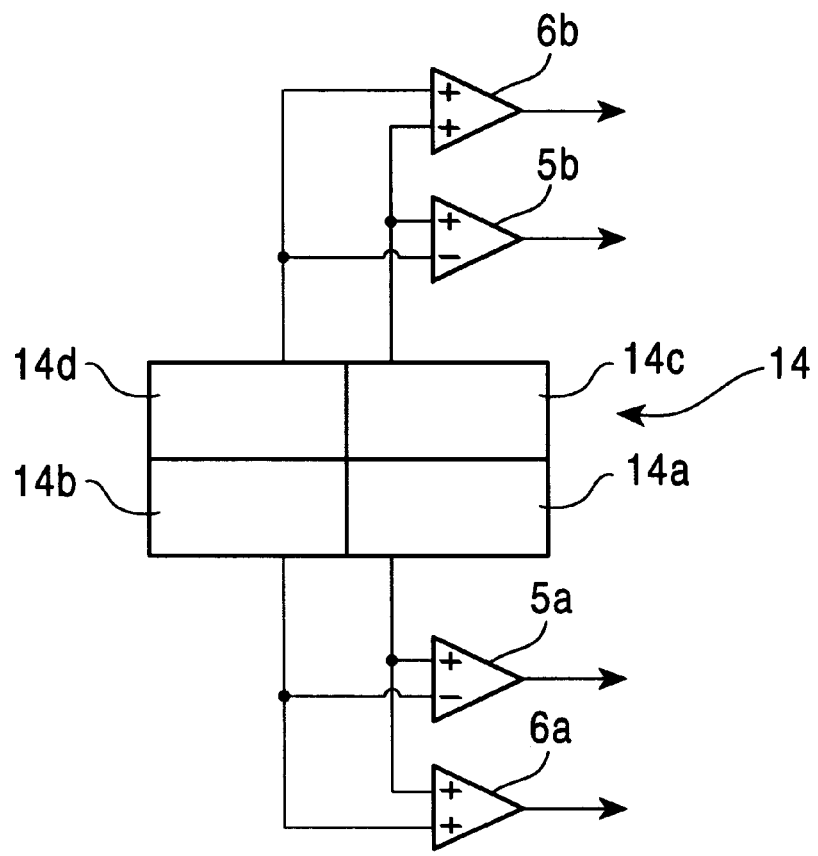

Light receiving means 14 is divided into four light receiving regions 14a, 14b, 14c, 14d as shown in the plan view of FIG. 4B. In addition, a wavelength filter 8 as wavelength separation means is disposed above the light receiving means 14.

As shown in FIG. 4A, the portion of the wavelength filter 8 which covers the light receiving regions 14a and 14b of the light receiving means 14 is a band pass filter 8a for causing the light having the wavelength of 650 nm or near to it to pass therethrough and the portion of the wavelength filter 8 which covers the light receiving regions 14c and 14d is a band pass filter 8b for causing the light having the wavelength of 780 nm or near to it to pass therethrough.

Thus, the light receiving means 14 is divided into the light receiving regions (14a, 14b) for receiving the light having the wavelength of 650 nm or near to it of the reflected light ①, ②, ③ and the regions (14c, 14d) for receiving the light having the wavelength of 780 nm or near to it thereof. Then, the region for receiving the light having the wavelength of 650 nm or near to it is further divided into the two light receiving regions 14a and 14b and there are provided subtraction means 5a for determining the difference between the quantities of light received by both the light receiving regions and addition means 6a for determining the sum of the quantities of received light. In addition, the region for receiving the light having the wavelength of 780 nm or near to it is divided into the two light receiving regions 14c and 14d and there are provided subtraction means 5b for determining the difference between the quantities of light received by the respective light receiving regions 14c, 14d and addition means 6b for determining the sum thereof.

Next, described below based on the flowchart shown in FIG. 5 will be a disc discrimination method of discriminating what type of disc a loaded disc is among many types of disc using the disc discrimination device shown in FIG. 1 to FIG. 4.

First, when power is supplied at step (a), detection light is irradiated from the light irradiation means 3 (or 13 or 23). At step (b), the discrimination means 7 discriminates the thickness of the protective layer of the disc D based on the output from the subtraction means 5 (or 5a or 5b). In this case, a value corresponding to a subtraction output when a recording surface is positioned 0.9 mm above the front surface Da of the disc is set as a threshold value which will be compared with the output from the subtraction means. In FIG. 5, the flowchart on the right side of step (b) shows the case that the thickness of the protective layer is determined 0.6 mm, whereas the flowchart on the left side of step (b) shows the case that the thickness of the protective layer is determined 1.2 mm.

Next, the reflection factor on the recording surface R2 to the light having 780 nm or near to it is discriminated at step (c). In FIG. 1, the light emitting light sources of the light irradiation means 3 are switched to the one for emitting the light having the wavelength of 870 nm or near to it and the magnitude of the quantity of received light obtained from the addition means 6 is determined. In the arrangements shown in FIG. 3 and FIG. 4, the sum of the outputs from the light receiving regions 14c, 14d for detecting the light having passed through the band pass filter 8b is obtained from the addition means 6a and the discrimination means 7 determines the magnitude thereof. At the time, a value which corresponds to the reflection factor of 50% on the recording surface R2 is set as a threshold value and the output from the addition means is compared with the threshold value.

A disc whose reflection factor to the light having the wavelength of 780 nm or near to it is determined greater than 50% by the discrimination at the step (c) is the DVD. When it is determined by the discrimination at the step (c) that a disc has a reflection factor smaller than 50% to the light having the wavelength of 780 nm or near to it, the reflection factor on the recording surface R2 of the disc to the light having the wavelength of 650 nm or near to it is further discriminated at step (d). This is executed by switching the light sources 3a in FIG. 1 or detecting the added value of the light receiving regions 14a and 14b obtained from the addition means 6a in FIG. 3 or FIG. 4.

When the reflection factor of 50% to the light having the wavelength of 650 nm or near to it is set as a threshold value and the reflection factor on the recording surface R2 is greater than 50%, the disc is determined the DVD-R, whereas when the reflection factor is smaller than 50%, the disc is determined the DVD-RAM.

On the other hand, when it is determined by the discrimination at step (b) that the thickness of the protective layer is 1.2 mm, the detection light having the wavelength of 780 nm or near to it is applied onto the recording surface R1 at step (e) and the quantity of light reflected from the recording surface R1 is detected by the addition means 6 shown in FIG. 1 or the addition means 6b shown in FIG. 4B. As a result, when it is detected that the reflection factor is smaller than 50%, it is discriminated that the loaded disc is the CD-E or the PD.

When it is discriminated that the reflection factor on the recording surface R1 to the light having the wavelength of 780 nm or near to it is greater than 50% at step (e), the detection light having the wavelength of 650 nm or near to it is applied onto the recording surface R1 of the disc. When the reflection factor on the recording surface R1 to the detection light is smaller than 50%, it is determined that the loaded disc is the CD-R, whereas when the reflection factor is greater than 50%, it is determined that the loaded disc is the CD.

Figure 5:
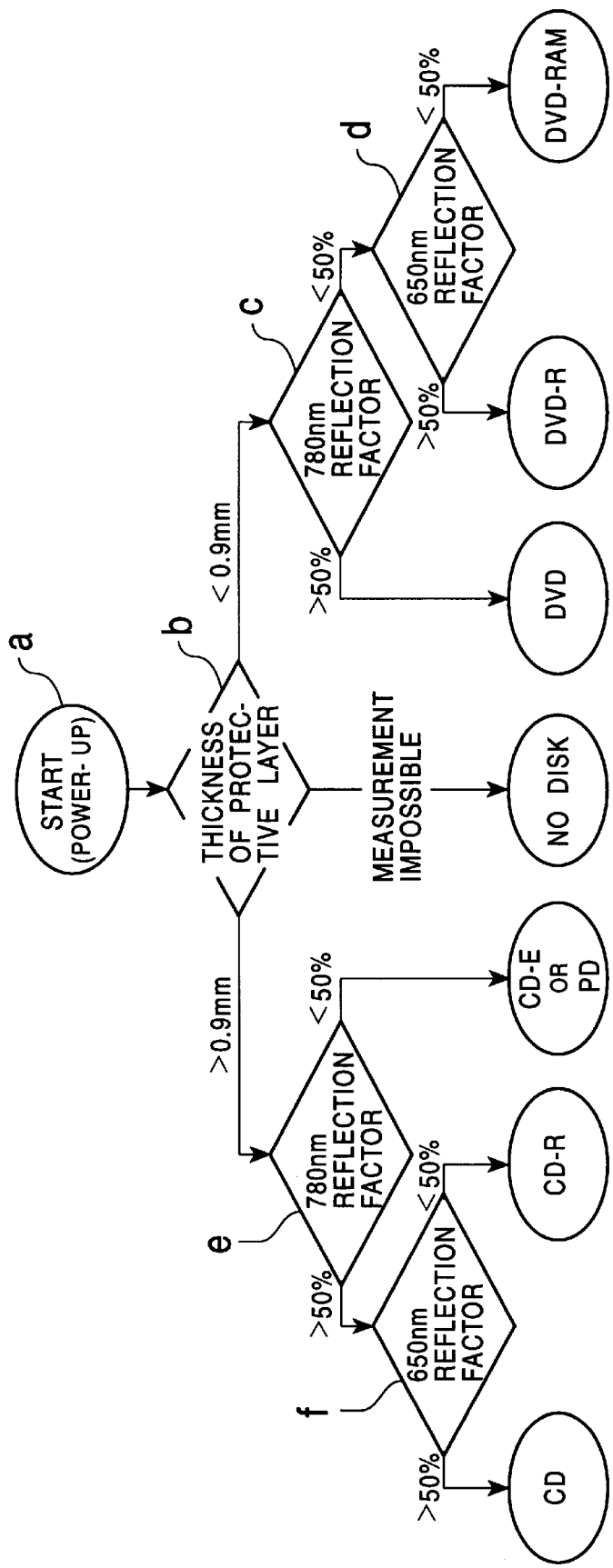
FIG. 5 is a flowchart of a disc discrimination method of the present invention.

As described above, since the disc discrimination devices shown in FIG. 1, FIG. 2 and FIG. 3 can discriminate the difference between the thicknesses of the protective layer of the discs, the magnitude of the reflection factors on the recording surface to the light having the wavelength of 780 nm or near to it and the magnitude of the reflection factors on the recording surface to the light having the wavelength of 650 nm or near to it, the discrimination devices can discriminate the many types of the disc as shown in FIG. 5.

As described above, according to the present invention, since a type of disc is determined by irradiating light onto the recording surface of the disc and detecting the light reflected therefrom, the type of disc can be instantly discriminated just after it is loaded without the need of actually reading the signal recorded on the disc by an optical head.

Since the disc is discriminated by both the thickness of the protective layer of a disc and the difference between the reflection factors on the recording surface thereof, many types of disc can be discriminated.

In particular, more types of disc can be discriminated by detecting the difference between the reflection factors on the recording surface to light having a different wavelength.

What is claimed is:

1. A disc discrimination device provided with a disc apparatus loadable with a disc having a recording surface to reflect light and selected from a plurality of discs with different thicknesses, comprising:

a light source disposed on one side of the recording surface and operative to obliquely irradiate detection light from the one side onto the recording surface of a loaded disc;

two light receiving regions to receive light reflected from the recording surface, the light source containing a plurality of light emitters, each emitter emitting light of a different wavelength;

reflecting material disposed on a side of the recording surface opposite from the one side of the recording surface where the light source is disposed, the reflecting material disposed such that light from the light source is reflected to the receiving regions in the absence of the loaded disc;

a band pass filter having a plurality of sections, each section passing light of a wavelength of one of the emitters, the band pass filter disposed such that each light receiving region is divided into a plurality of light receiving sections;

a plurality of determining mechanisms to determine a plurality of differences, each determining mechanism to determine a difference between an amount of reflected light received by one light receiving section in one of the light receiving regions and a corresponding light receiving section in another of the light receiving regions, the reflected light being reflected from one of the recording surface and the reflecting material, the plurality of differences being a combination of each difference;

a plurality of addition mechanisms to determine a plurality of totals, each addition mechanism to determine a total amount of light received by the one light receiving section in one of the light receiving regions and the corresponding light receiving section in another of the light receiving regions, the reflected light being reflected from one of the recording surface and the reflecting material, the plurality of totals being a combination of each total;

a discrimination mechanism to detect the plurality of differences and plurality of totals, the amount of reflected light from the recording surface received by each receiving region dependent on the disc thickness of the loaded disc, the discrimination mechanism to classify the loaded disc dependent on the plurality of differences and the plurality of totals of light reflected from the recording surface, and the discrimination mechanism to detect the absence of the loaded disc in response to the plurality of differences and plurality of totals of light reflected from the reflecting material in the absence of the loaded disc.

2. The disc discrimination device of claim 1, wherein the light source is variable in intensity.

3. The disc discrimination device of claim 1, further comprising a collimating lens disposed between the source and the loaded disc, the collimating lens operative to collimate the light from the source.

4. The disc discrimination device of claim 1, further comprising a condensing lens disposed between the loaded disc and the light receiving regions, the condensing lens operative to focus the reflected light onto the light receiving regions.

5. The disc discrimination device of claim 1, wherein the emitters irradiate the recording surface at the same time.

6. The disc discrimination device of claim 1, wherein the emitters irradiate the recording surface at different times thus individually irradiating the recorded surface with light of a specific wavelength.

7. The disc discrimination device of claim 1, wherein the addition mechanisms determine a difference between reflection factors of the recording surface of the loaded disc with respect to wavelengths of light from the light source.

8. A disc discrimination device provided with a disc apparatus loadable with a disc having a recording surface to reflect light and selected from a plurality of discs with different thicknesses, comprising:

a light source disposed on one side of the recording surface and operative to obliquely irradiate detection light from the one side onto the recording surface of a loaded disc, the light source containing a plurality of light emitters, each emitter emitting light of a different wavelength;

two light receiving regions operative to receive light reflected from the recording surface;

a band pass filter disposed between the loaded disc and the light receiving regions, the band pass filter having a plurality of sections and disposed such that each light receiving region is divided into a plurality of light receiving sections, each section passing light of a wavelength of one of the emitters;

a plurality of determining mechanisms to determine a plurality of differences, each determining mechanism to determine a difference between an amount of reflected light received by one light receiving section in one of the light receiving regions and a corresponding light receiving section in another of the light receiving regions, the reflected light being reflected from the recording surface, the plurality of differences being a combination of each difference; and a discrimination mechanism to detect the plurality of differences, the amount of reflected light from the recording surface received by each receiving region dependent on the disc thickness of the loaded disc, the discrimination mechanism to classify the loaded disc in response to the plurality of differences of light reflected from the recording surface.

9. The disc discrimination device of claim 8, further comprising reflecting material disposed on a side of the recording surface opposite from the one side of the recording surface where the light source is disposed, the reflecting material disposed such that light from the light source is reflected to the receiving regions in the absence of the loaded disc, the absence of the loaded disc determined by the determining mechanism, the determining mechanism determining a difference between an amount of reflected light from the reflecting material received by each receiving region in the absence of the loaded disc and detecting the absence of the loaded disc in response to the difference between the amount of reflected light from the reflecting material received by each receiving region.

10. The disc discrimination device of claim 8, further comprising an addition mechanism to determine a total amount of light received by each light receiving region, the loaded disc being further classified by the discrimination mechanism in response to the total amount of light received by each light receiving region.

11. The disc discrimination device of claim 8, wherein the light emitters are independently variable in intensity.

12. The disc discrimination device of claim 8, further comprising a collimating lens disposed between the source and the loaded disc, the collimating lens operative to collimate the light from the source.

13. The disc discrimination device of claim 8, further comprising a condensing lens disposed between the loaded disc and the light receiving regions, the condensing lens operative to focus the reflected light onto the light receiving regions.

14. The disc discrimination device of claim 8, wherein the emitters irradiate the recording surface at the same time.

15. The disc discrimination device of claim 8, wherein the emitters irradiate the recording surface at different times thus individually irradiating the recorded surface with light of a specific wavelength.

16. The disc discrimination device of claim 10, wherein the addition mechanism determines a difference between reflection factors of the recording surface of the loaded disc with respect to wavelengths of light from the light source.

17. A disc discrimination device provided with a disc apparatus loadable with a disc having a recording surface to reflect light and selected from a plurality of discs with different thicknesses, comprising:

a light source containing a plurality of light emitters, disposed on one side of the recording surface of a loaded disc, and operative to obliquely irradiate detection light from the one side onto the recording surface of a loaded disc, each emitter emitting light of a different wavelength and being individually variable in intensity;

two light receiving regions operative to receive light reflected from the recording surface;

a band pass filter disposed between the loaded disc and the light receiving regions, the band pass filter having a plurality of sections and disposed such that each light receiving region is divided into a plurality of light receiving sections, each section passing light of a wavelength of one of the emitters;

a plurality of determining mechanisms to determine a plurality of differences, each determining mechanism to determine a difference between an amount of reflected light received by one light receiving section in one of the light receiving regions and a corresponding light receiving section in another of the light receiving regions, the reflected light being reflected from the recording surface, the plurality of differences being a combination of each difference;

a plurality of addition mechanisms to determine a plurality of totals, each addition mechanism to determine a total amount of light received by the one light receiving section in one of the light receiving regions and the corresponding light receiving section in another of the light receiving regions, the reflected light being reflected from one of the recording surface and the reflecting material, the plurality of totals being a combination of each total; and a discrimination mechanism to detect the plurality of differences, the amount of reflected light from the recording surface received by each receiving region dependent on the disc thickness of the loaded disc, the discrimination mechanism to classify the loaded disc in response to the plurality of differences and plurality of totals of light reflected from the recording surface.

18. The disc discrimination device of claim 17, further comprising reflecting material disposed on a side of the recording surface opposite from the one side of the recording surface where the light source is disposed, the reflecting material disposed such that light from the light source is reflected to the receiving regions in the absence of the loaded disc, the absence of the loaded disc determined by the determining mechanism, the determining mechanism determining a difference between an amount of reflected light from the reflecting material received by each receiving region in the absence of the loaded disc and detecting the absence of the loaded disc in response to the difference between the amount of reflected light from the reflecting material received by each receiving region.

19. The disc discrimination device of claim 17, further comprising a collimating lens disposed between the source and the loaded disc and a condensing lens disposed between the loaded disc and the light receiving regions, the collimating lens operative to collimate the light from the source, the condensing lens operative to focus the reflected light onto the light receiving regions.

20. The disc discrimination device of claim 17, wherein the emitters irradiate the recording surface at the same time.

21. The disc discrimination device of claim 17, wherein the emitters irradiate the recording surface at different times thus individually irradiating the recorded surface with light of a specific wavelength.

22. The disc discrimination device of claim 17, wherein the addition mechanisms determine a difference between reflection factors of the recording surface of the loaded disc with respect to wavelengths of light from the light source.

* * * * *